United States Patent [19]
Sokolich et al.

[11] Patent Number: 5,909,490
[45] Date of Patent: Jun. 1, 1999

[54] OMNIDIRECTIONAL AUDIO IN A COMMUNICATIONS DEVICE

[75] Inventors: Gary Sokolich, Newport Beach; Larry Gach, San Diego; Steven Cook, Oceanside; K. H. Chong, San Diego, all of Calif.

[73] Assignee: Hughes Electronics Corporation, El Segundo, Calif.

[21] Appl. No.: 08/889,170

[22] Filed: Jul. 7, 1997

[51] Int. Cl.[6] .............................. H04M 1/00; H04R 25/00
[52] U.S. Cl. ...................... 379/433; 379/428; 381/387; 381/338; 381/339; 455/90; 455/350; 455/351
[58] Field of Search ..................... 381/387, 388, 381/395, 189, 339, 338, 337, 334, 332, FOR 150, FOR 140, FOR 141, FOR 142, FOR 143; 455/6.3, 569, 575, 90, 100, 350, 351, 347; 379/420, 432, 433, 428, 440

[56] References Cited

U.S. PATENT DOCUMENTS

| | | |
|---|---|---|
| 4,257,121 | 3/1981 | Henderson et al. ................. 455/351 |
| 5,241,592 | 8/1993 | Carlson et al. ..................... 455/90 |
| 5,276,916 | 1/1994 | Pawlish et al. ..................... 455/575 |
| 5,461,672 | 10/1995 | Enokido et al. .................... 379/433 |
| 5,555,449 | 9/1996 | Kim .................................... 381/338 |

*Primary Examiner*—Curtis A. Kuntz
*Assistant Examiner*—Xu Mei
*Attorney, Agent, or Firm*—John T. Whelan; Michael W. Sales

[57] ABSTRACT

An approach for omnidirectional audio in a communications device has a communications device housing having a front housing including an opening; an earpiece transducer that directs sound waves through the opening; an audio transducer positioned within the communications device housing to direct audio waves in a direction substantially away from a direction in which the sound waves are directed; a cavity having a long axis oriented off axis relative to the direction in which the audio transducer directs audio waves, the cavity being juxtaposed with the audio transducer so as to receive the audio waves directed therefrom; and an omnidirectional audio port located at an end of the cavity, the omnidirectional audio port including an opening through which the audio waves directed from the audio transducer are emitted.

8 Claims, 4 Drawing Sheets

OMNIDIRECTIONAL AUDIO IN A COMMUNICATIONS DEVICE

BACKGROUND OF THE INVENTION

The present invention relates to omnidirectional audio, and more particularly, to omnidirectional audio in a communications device.

Typical communications devices, and in particular, mobile communications devices, such as cellular telephones or mobile radios, have a front mounted transducer, i.e., speaker that may or may not also serve as a microphone. When a mobile radio is used in private mode for private conversations, such as in the case of cellular radios, the user typically places the transducer near his/her ear while simultaneously positioning a microphone proximate to his/her mouth. In contrast, however, when a mobile radio is used in a dispatch mode, such as in the case of a citizens band radio, police radio, a commercial radio, or other public or private band radio, the user typically holds the radio such that the speaker, and microphone, if present, face the user.

In the dispatch mode of operation, holding the speaker and microphone facing the user provides satisfactory operation, so long as the dispatch mode mobile radio is utilized in an area that is relatively free from background noise, and so long as the user continues to hold the dispatch mode mobile radio in position. However, because dispatch mode mobile radios are typically used in a working environment, such as at a construction site, by police officers or security officers in the line of duty, by delivery persons, or by other workers, the user will typically find it inconvenient to hold the dispatch mode mobile radio in position in front of his/her mouth while at the same time attempting to carry out his/her job functions. This is particularly true when the dispatch mode mobile radio is being used only to receive, and not to transmit, i.e., when the use is listening to dispatch mode transmissions, but not transmitting him/herself. Thus, users of dispatch mode mobile radios typically hold the dispatch mode mobile radio at their side, or affix the dispatch mode mobile radio to their belt while they are not transmitting with, i.e., talking on the dispatch mode mobile radio.

Unfortunately, however, if a dispatch mode transmission is received by the dispatch mode mobile radio while it is held in a lowered position, either, for example, in the user's hand, or affixed to the user's belt, the transducer, i.e., speaker, that is in heretofore known dispatch mode mobile radios is not optimally positioned to project sound omnidirectionally such that the user has a maximum possibility of hearing the received transmission regardless of the position in which the dispatch mobile radio is held at the time that the transmission is received. Instead, heretofore known dispatch mode mobile radios typically have a single speaker that projects sound through openings on a front housing.

Also known in the art, are communications devices in which both cellular or other telephone-like functionalities are provided, (i.e., private mode communications) and in which dispatch mode communications are also provided. When such communications devices are in private mode, transmissions are sounded at a low volume. Private conversations can be conducted between the user of the communications device and a remote station, with the user placing the transducer in the communications device proximate to his/her ear (hence the low volume) and the microphone in the communications device proximate to his/her mouth such as with typical telephone devices. When such communications devices are in dispatch mode, dispatch mode transmissions are simultaneously transmitted to and received by a plurality of similar communications devices that sound such transmissions through their transducers at a much higher volume. Thus, in these combination private and dispatch mode communications devices, the possibility is present that the user be exposed to loud (i.e., high volume) dispatch mode communications while the communications device is held with its transducer proximate to the users ear, especially, either preceding, during or following private mode communications (which are at a low volume), thus potentially causing injury and causing discomfort to the user, Various approaches have been developed to assure that the user is not exposed to loud dispatch mode communications while the communications device is held proximate to the users ear, such as through the use of a "flip" that, when opened, lowers the volume level of the transducer within the communications device to a level appropriate to situations in which the transducer of the communications device is held proximate to the user's ear and, when closed, raises the volume level of the transducer within the communications device to a level appropriate to situations in which the transducer of the communications device is held distant from the user's ear. (See Pawlish, et al., U.S. Pat. No. 5,276,916). Without such approaches, however, a risk arises that loud dispatch mode emissions from the transducer will be made while the transducer is held proximate to the user's ear, thus risking discomfort and even injury to the user.

Furthermore, even with such approaches, the transducer in such "flip" mobile radios is not optimally positioned to project sound omnidirectionally, such that the user has a maximum possibility of hearing received transmissions regardless of the position in which the "flip" mobile radio is held at the time the transmission is received.

The present invention advantageously addresses the above and other needs.

SUMMARY OF THE INVENTION

The present invention advantageously addresses the needs above as well as other needs by providing omnidirectional audio in a communications device, and more particularly, to omnidirectional audio in a mobile radio.

In one embodiment, the invention can be characterized as a system for omnidirectional audio in a communications device. Such system has a communications device housing having a front housing including an opening; an earpiece transducer positioned within the communications device housing to direct sound waves through the opening; an audio transducer positioned within the communications device housing to direct audio waves in a direction substantially away from a direction in which the sound waves are directed; a cavity having a long axis oriented off axis relative to the direction in which the audio transducer directs audio waves, the cavity being juxtaposed with the audio transducer so as to receive the audio waves directed therefrom; and an omnidirectional audio port located at an end of the cavity, the omnidirectional audio port including an opening through which the audio waves directed from the audio transducer are emitted.

In another embodiment, the present invention can be characterized as a method for omnidirectional audio in a communications device. The method involves positioning an earpiece transducer within a communications device housing to direct sound waves through an opening in the communications device housing; positioning an audio transducer within the communications device housing to direct audio waves in a direction substantially away from a direction in which the sound waves are directed; forming a cavity, having a long axis oriented off axis relative to the direction in which the audio transducer directs audio waves, juxtaposed with the audio transducer so as to receive the audio waves directed therefrom; and locating an omnidirectional audio port at an end of the cavity.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figures 1, 2:
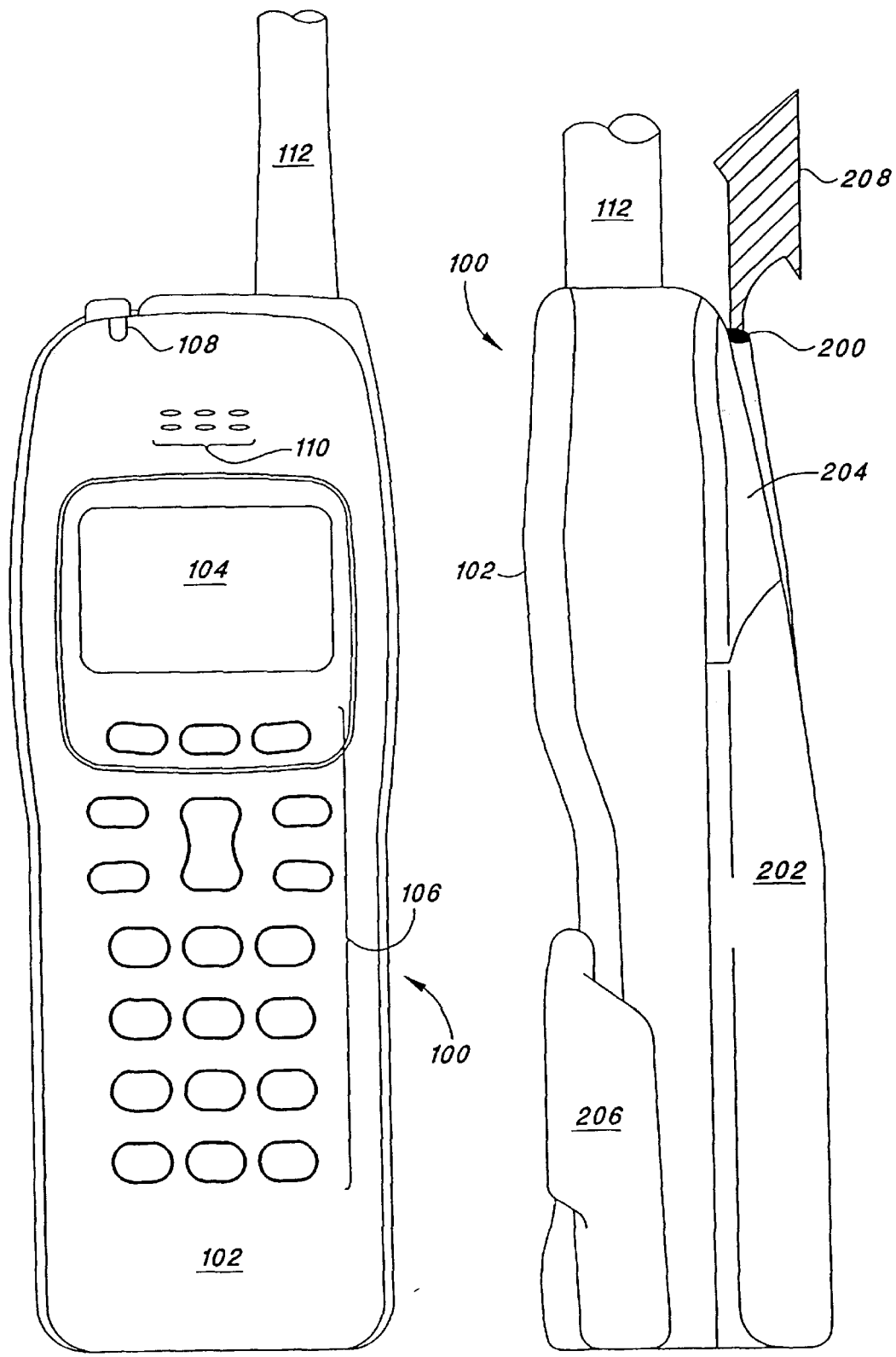
FIG. 1 is a front view of a communications device featuring a rear-mounted omnidirectional audio port in accordance with one embodiment of the present invention.
FIG. 2 is a side view of the communications device of FIG. 1 with the rear-mounted omnidirectional audio port.

Referring next to FIG. 1, a front view is shown of a communications device 100 featuring a rear-mounted omnidirectional audio port. Shown are a front housing 102, a display 104, a keypad 106, a ringer port (not shown), an earpiece port 110 and an antenna 112. Also part of the embodiment shown in FIG. 1, but not readily observable therein, is the rear-mounted omnidirectional audio port.

Referring next to FIG. 2, a side view is shown of the communications device wherein the front housing 102, the rear-mounted omnidirectional audio port 200, the antenna 112, a battery 202, a hood 204 and a hinged flip 206 can be observed. As can be seen, the rear-mounted omnidirectional audio port 200 is positioned so as to direct sound 208 (represented by a cross-hatched arrow) generally upwardly from a position near the top of the communications device 100, and slightly to its rear. Central orientation provides substantial omnidirectionallity in the audio produced within a horizontal plane normal to the long axis of the communications device 100.

Note, the hinged flip 206 serves only ergonomic purposes, and does not affect the volume levels produced either by an audio transducer (used for dispatch mode communications) or an earpiece transducer (used for private mode communications).

Figure 3:
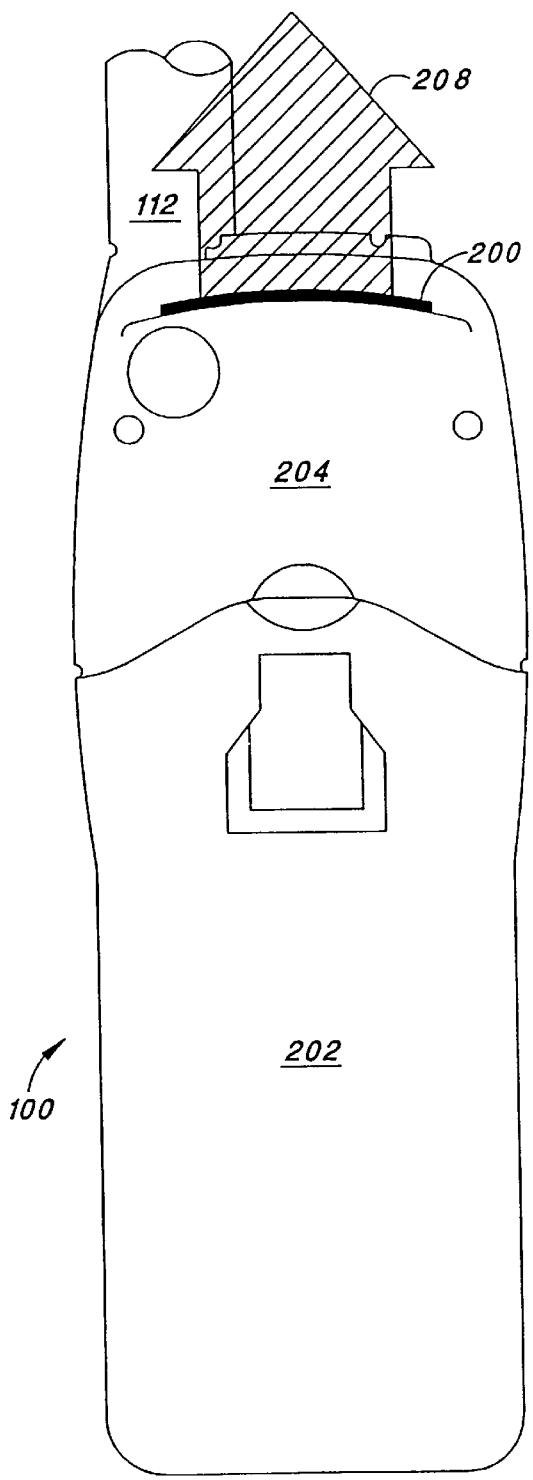
FIG. 3 is a rear view of the communications device of FIG. 1 with the rear-mounted omnidirectional audio port.

Referring next to FIG. 3, a rear view is shown of the communications device 100 featuring the rear-mounted omnidirectional audio port 200 in accordance with the present embodiment of the invention. Shown are a hood 204, a battery 202, the antenna 112, and the rear-mounted omnidirectional audio port 200.

As can be seen, the rear-mounted omnidirectional audio port 200 provides a generally top-located upwardly oriented slot out of which audio waves 208 emanating from an audio transducer (not shown) are emitted. Advantageously, this upwardly oriented emission of sound waves results in a substantially omnidirectional production of sound from the communications device 100 within a horizontal plane normal to a long axis of the communications device 100.

Figure 4:
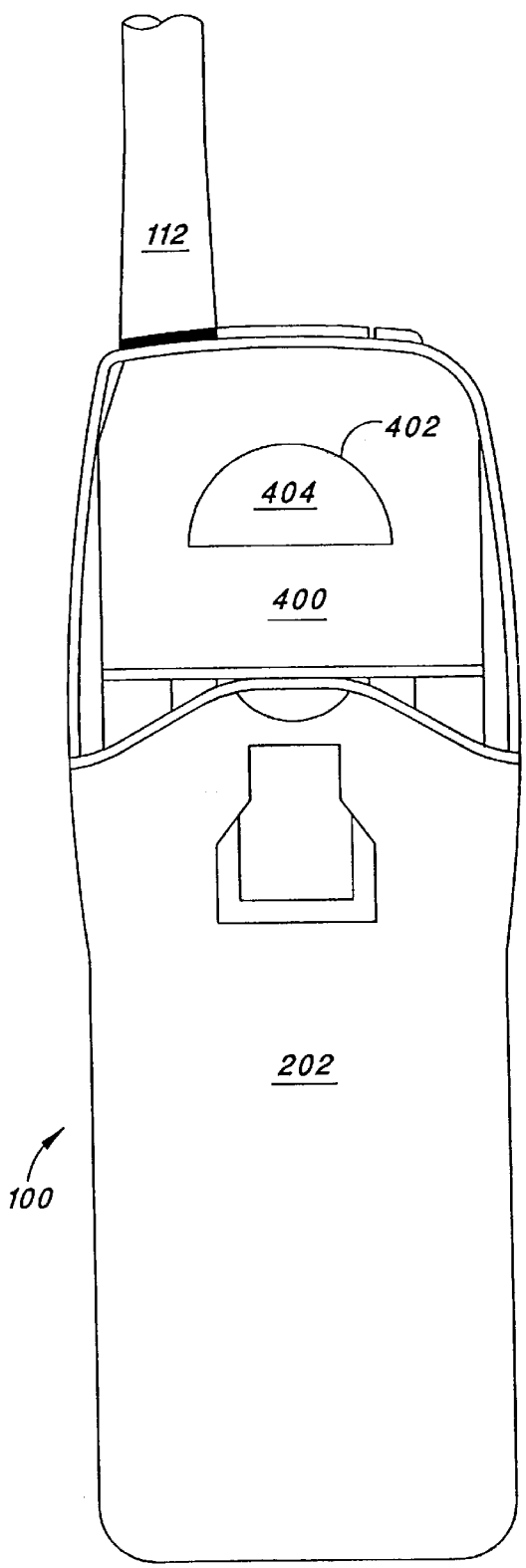
FIG. 4 is a rear view of the communications device of FIG. 1 with a hood that serves a part of the rear-mounted omnidirectional audio port removed so as to expose a magnesium EMI/RFI shield 400 casting that also serves as a part of the rear-mounted omnidirectional audio port.

Referring next to FIG. 4, a rear-view is shown of the communications device 100 with the hood 204 (FIG. 3) that serves as part of the rear-mounted omnidirectional audio port removed so as to expose a magnesium EMI/RFI shield 400 casting that also serves as part of the rear-mounted omnidirectional audio port 200. A semi-circular opening in the magnesium EMI/RFI shield casting 400 is positioned immediately adjacent to (immediately over in FIG. 4) an audio transducer 404 and serves to direct audio waves emitted therefrom in a generally outward and upward (i.e., out of the paper and then toward the top of the paper as oriented in FIG. 4. A cavity (see 500 in FIG. 5) formed between the magnesium EMI/RFI shield casting 400 and the hood (not shown in FIG. 4) provides a passageway or channel through which the audio waves propagate upwardly (toward the top of the paper in FIG. 4) until exiting through the rear-mounted omnidirectional audio port 200.

Figure 5:
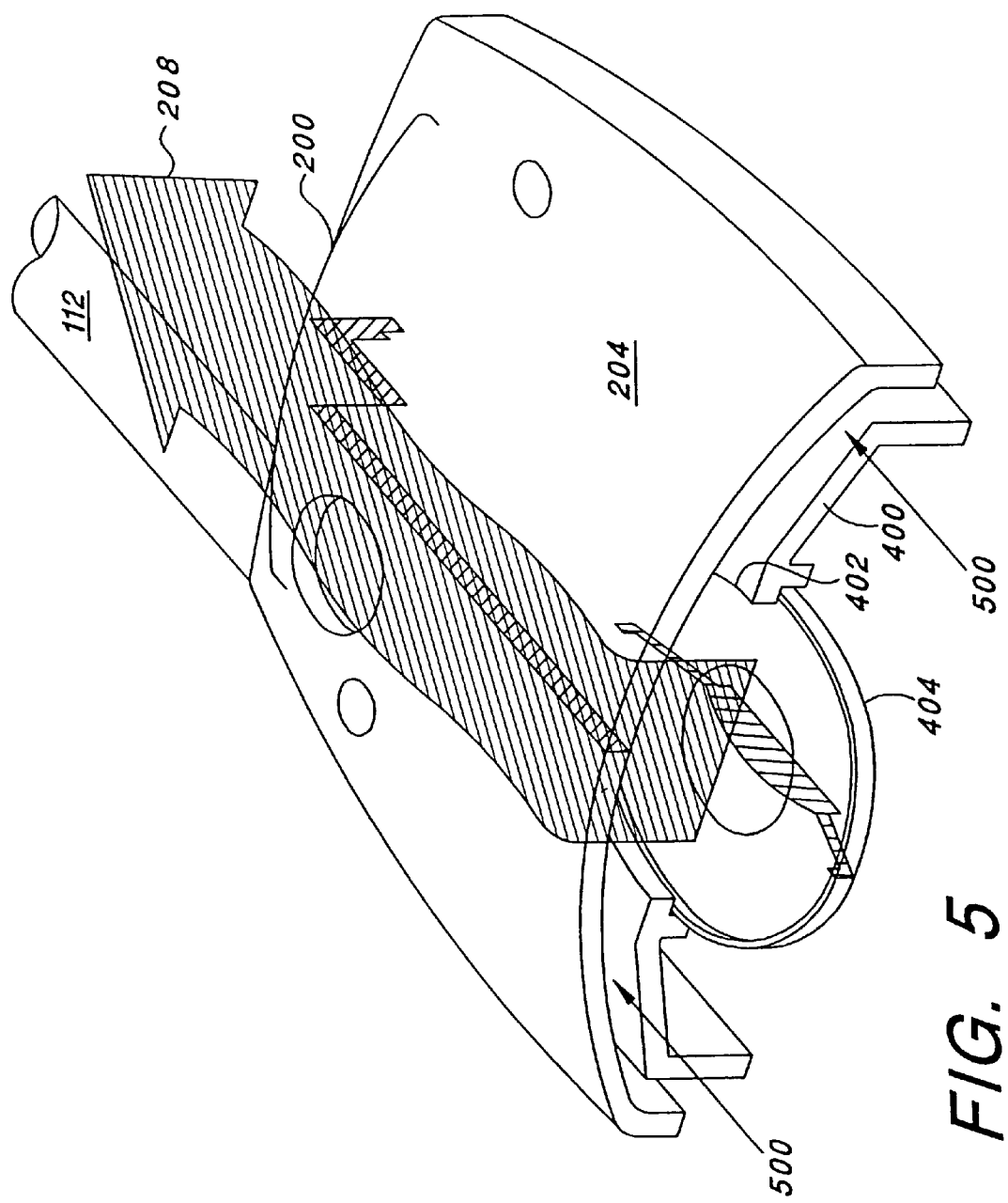
FIG. 5 is a rear partial perspective view of the hood, a portion of the magnesium EMI/RFI shield casting and an audio transducer that are part of the rear-mounted omnidirectional audio port.

Referring next to FIG. 5, a rear partial perspective view is shown of the hood 204, the magnesium EMI/RFI shield casting 400 and the audio transducer 404. Also depicted are the semi-circular opening 402, the audio waves 208 and the antenna 112. As will be appreciated by the skilled artisan, the hood and magnesium EMI/RFI shield casting 400 together from a cavity 500 or tunnel 500 into which the audio waves 208 from the audio transducer 404 are directed and through which such audio waves 208 propagate until exiting the communications device through the rear mounted omnidirectional audio port 200. The audio waves 208 from the audio transducer 404 enter the cavity 500 or tunnel 500 through the semi-circular opening 402 in the magnesium EMI/RFI shield casting 400. In operation, the hood 204 and magnesium EMI/RFI shield casting 400 redirect the audio waves 206 emitted from the audio transducer 404 to an off-axis direction roughly parallel to the long axis of the communications device 100 (see, e.g., FIG. 1). In this way, substantial omnidirectionallity is achieved within a horizontal plane normal to the long axis of the communications.

Figure 6:
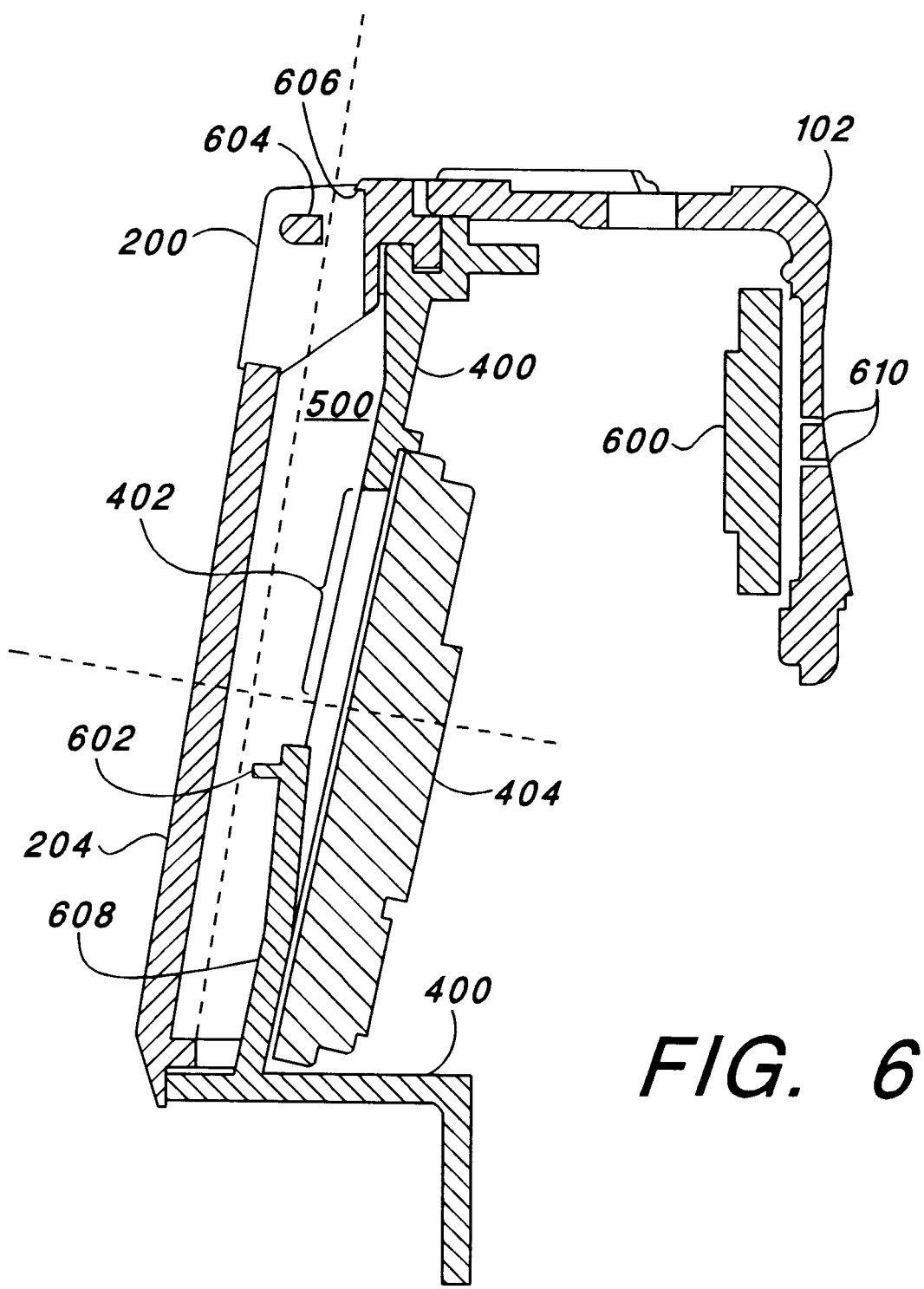
FIG. 6 is a side partial cross-sectional view of the hood, and of the communications device of FIG. 1, a portion of the magnesium EMI/RFI shield casting, both of which are part of the rear-mounted omnidirectional audio port; and a portion of a front housing; the audio transducer; and an earpiece transducer, all of which are part of the communications device of FIG. 1.

Referring next to FIG. 6, a partial cross-sectional view is shown of the hood 204, a portion of the magnesium EMI/RFI shield casting 400, the audio transducer 600, a portion of the front housing 102 and the earpiece transducer. Also shown between the hood 204, and the portion of the aluminum heat shield casting 400 is a cavity 500 into which the audio waves emitted by the audio transducer 404 are directed, and through which such audio waves travel toward the rear-mounted omnidirectional audio port 200. Further shown in FIG. 6 are first, second and third obstructions 602, 604, 606, which serve to improve the acoustic quality, i.e., spectral content, of the audio waves emitted from the rear-mounted omnidirectional audio port 200. Also shown is a deflected portion 508 of the aluminum heat shield casting 400, which also serves to improve the acoustic qualities of the rear-mounted omnidirectional audio port 200.

In operation, when private mode communications are utilized, the earpiece transducer 600 sounds incoming communications through openings 510 in the front housing 102 near where the user would position his/her ear during private mode usage. Sound waves emitted from the earpiece transducer are of a low volume so as not to cause discomfort or damage to the user's ear during usage. During dispatch mode communications, audio waves of a relatively large volume are emitted from the audio transducer 400, which is oriented opposite the earpiece transducer 600, so as to avoid sounding the relatively large volume (i.e., loud) sound waves emitted from the audio transducer 404 into the user's ear, even if the user has the communications device 100 position at or near his/her ear. The audio waves emitted from the audio transducer 404 are directed into the cavity 500, which is formed between the hood 204 and the aluminum heat shield casting 400. From the cavity 500, the audio sound waves are directed upwardly (as oriented in FIG. 6) toward the rear-mounted omnidirectional audio port 200. These audio waves are then emitted from the rear-mounted omnidirectional audio port 200 creating a sensation of omnidirectional sound as heard in a plane normal to the long axis of the communications device 100. In this way, omnidirectionallity is achieved in dispatch mode audio emissions, and at the same time the hazards inherent in the relatively loud audio wave emissions generated by the audio transducer 404 during dispatch mode communications are avoided.

While the invention herein disclosed has been described by means of specific embodiments and applications thereof, numerous modifications and variations could be made thereto by those skilled in the art without departing from the scope of the invention as set forth in the claims.

What is claimed is:

1. A system for omnidirectional audio in a communications device comprising:

a communications device housing having a front housing including an opening;

an earpiece transducer positioned within the communications device housing to direct sound waves through the opening;

an audio transducer positioned within the communications device housing to direct audio waves in a direction substantially away from a direction in which the sound waves are directed;

a cavity having a long axis oriented off axis relative to the direction in which the audio transducer directs audio waves, the cavity being juxtaposed with the audio transducer so as to receive the audio waves directed therefrom; and an omnidirectional audio port located at an end of the cavity, the omnidirectional audio port including an opening through which the audio waves directed from the audio transducer are emitted.

2. The system of claim 1 further including:

a semi-circular opening in said cavity through which said audio waves from the audio transducer are directed.

3. The system of claim 1 wherein said long axis of said cavity at least 45 degrees off axis relative to said direction in which said audio transducer directs audio waves.

4. The system of claim 1 wherein said cavity comprises:

a hood; and a shield, the shield and the hood forming respective sides of said cavity, the shield including the semi-circular opening.

5. A method for omnidirectional audio in a communications device comprising:

positioning an earpiece transducer within a communications device housing to direct sound waves through an opening in the communications device housing;

positioning an audio transducer within the communications device housing to direct audio waves in a direction substantially away from a direction in which the sound waves are directed;

forming a cavity, having a long axis oriented off axis relative to the direction in which the audio transducer directs audio waves, juxtaposed with the audio transducer so as to receive the audio waves directed therefrom; and locating an omnidirectional audio port at an end of the cavity.

6. The method of claim 5 further including:

forming a semi-circular opening in said cavity adjacent to said audio transducer.

7. The method of claim 5 wherein positioning of said audio transducer includes orienting said direction in which said audio transducer directs audio waves at least 45 degrees off axis relative to said long axis of said cavity.

8. The method of claim 5 wherein said forming of said cavity comprises positioning a hood adjacent to a shield so that the hood and the shield form respective sides of said cavity.

\* \* \* \* \*